United States Patent [19]
Waid

[11] Patent Number: 5,702,070
[45] Date of Patent: Dec. 30, 1997

[54] APPARATUS AND METHOD USING RELATIVE GPS POSITIONING FOR AIRCRAFT PRECISION APPROACH AND LANDING

[75] Inventor: James D. Waid, Grove City, Ohio

[73] Assignee: E-Systems, Inc., Dallas, Tex.

[21] Appl. No.: 531,133

[22] Filed: Sep. 20, 1995

[51] Int. Cl.$^6$ .............................. G01S 13/86; G08G 5/02
[52] U.S. Cl. ...................... 244/183; 342/359; 342/33; 340/988; 364/460
[58] Field of Search .................. 244/183; 342/357, 342/33, 56, 457, 410; 340/988, 945; 364/460, 449, 458, 454, 428

[56] References Cited

U.S. PATENT DOCUMENTS

| | | | |
|---|---|---|---|
| 4,680,587 | 7/1987 | Chisholm | 342/33 |
| 4,740,899 | 4/1988 | McElreath | 244/183 |
| 4,866,450 | 9/1989 | Chisholm . | |
| 4,894,655 | 1/1990 | Joguet et al. . | |
| 4,894,662 | 1/1990 | Counselman . | |
| 5,119,102 | 6/1992 | Barnard | 244/183 |
| 5,132,695 | 7/1992 | Dumas et al. . | |
| 5,216,611 | 6/1993 | McElreath . | |
| 5,252,982 | 10/1993 | Frei . | |
| 5,311,194 | 5/1994 | Brown . | |
| 5,311,195 | 5/1994 | Mathis et al. . | |
| 5,344,105 | 9/1994 | Youhanaie . | |
| 5,381,140 | 1/1995 | Kuroda et al. . | |
| 5,438,337 | 8/1995 | Aquado | 342/357 |
| 5,446,465 | 8/1995 | Diefes et al. | 342/357 |

OTHER PUBLICATIONS

GPS Relative Navigation: An Assessment of a Revolutionary Precision Approach System, by D. Brown, et al., 3rd Edition.

*Primary Examiner*—Galen L. Barefoot
*Attorney, Agent, or Firm*—Harold E. Meier

[57] ABSTRACT

A relative GPS landing system is provided for approach and landing of aircraft where an accurate site survey of the GPS platform is unavailable. Data containing information on all GPS satellites in view is uplinked from a ground station to an aircraft. A relative solution is derived at the aircraft. Based upon the calculated solution, aircraft guidance signals are generated for approach and landing of the aircraft at a desired point.

21 Claims, 7 Drawing Sheets

| (6 SV's each message) | # Bits/ SV | Bits/ 0.5 sec |
|---|---|---|
| Message Header | N/A | 8 |
| Time | N/A | 8 |
| SVID (Space Vehicle ID) | 6 | 36 |
| Spare | N/A | 4 |
| PR (Full Pseudo Range) | 32 | 192 |
| PRR (Full Psuedo Range Rate) | 12 | 72 |
| Approach/Airport Ref. Data Header | N/A | 5 |
| Spare | N/A | 3 |
| Rotating Approach/Airport Ref. Data | N/A | 48 |
| CRC (Cyclic Redundancy Check) | N/A | 24 |
| Total 1/2 Second Data Bits | | 400 |
| Total BPS | | 800 |

APPARATUS AND METHOD USING RELATIVE GPS POSITIONING FOR AIRCRAFT PRECISION APPROACH AND LANDING

TECHNICAL FIELD

The present invention relates to a navigation system using the Global Positioning System (GPS) or similar satellite navigation systems and, in particular, to a relative GPS navigation system for aircraft precision approach and landing.

BACKGROUND OF THE INVENTION

The Global Positioning System (GPS) is a navigation system consisting of a network of satellites orbiting the Earth and continuously transmitting two L-band frequency carrier waves (L1-1575.42 MHz; L2-1227.6 MHz) modulated by pseudo-random noise (PRN) codes and a 50 Hz data signal. The L1 carrier wave is modulated by three signals; (1) a C/A-code signal (PRN code), (2) a P-code signal (PRN code), and (3) the 50 Hz data signal. The L2 carrier wave is modulated by the C/A-code signal and the 50 Hz data signal.

The C/A-code signal is referred to as the "Coarse/Acquisition" signal. The C/A-code signal is a gold sequence (one of thirty-six different possible gold sequences) having a chip rate of 1.023 MHz, with the sequence being repeated once every one millisecond. As such, there are 1,023 chips (similar to data bits) in each gold sequence. Each GPS satellite broadcasts its own unique gold sequence for identification purposes. The P-code signal is referred to as the "precise" or "protected" signal. The P-code signal has a chip rate of 10.23 MHz, and has a very long sequence, with the sequence being repeated no more than once every 267 days.

The L1 carrier wave is modulated by the C/A-code signal using the binary phase shift keying (BPSK) technique. Likewise, the P-code signal modulates the L1 carrier wave using this BPSK technique. Since the chip rate of the P-code signal is exactly ten times the chip rate of the C/A-code signal, the P-code modulation additionally uses phase quadrature modulation where the L1 carrier wave is phase shifted 90° prior to modulation by the P-code signal. After modulation, the C/A-code signal modulated L1 carrier wave is mixed with the P-code modulated L1 carrier wave (90° phase shift) to generate the transmitted L1 carrier signal. As a result, the L1 carrier signal contains both the C/A-code signal and the P-code signal. In contrast, the L2 carrier wave only carries the C/A-code signal. Additionally, both the L1 and L2 carrier waves are modulated by a 50 Hz data signal containing clock and clock offset information, satellite ephemeris information and almanac data of orbital parameters for all GPS satellites.

A GPS receiver utilizes one or both carrier signals from at least four satellites to calculate a relatively accurate position of the GPS receiver. Generally, this calculation is based on measurements of pseudoranges. Pseudoranges are time measurements of how long the GPS signal took to reach the receiver from the GPS satellite. The accuracy of the GPS position solution can be increased, including calculations of the GPS receiver velocity, from additional measurements of the carrier frequency phase and/or doppler frequency. In general, the accuracy of the GPS solution, whether position or velocity solution, depends on any errors or inaccuracies introduced in the GPS signals (intentional or unintentional) by the GPS satellite (imperfect orbits, selective availability), by the GPS satellite and receiver hardware (satellite and receiver clocks), and by physical phenomena affecting the GPS signal's trip through the atmosphere and ionosphere, etc. As such, clock errors, atmospheric errors, receiver noise, multipath, satellite position errors, etc., all add inaccuracy to the system.

One well-known method of improving the accuracy of the GPS position solution is called differential GPS (DGPS). DGPS relies on the assumption that most errors introduced in a satellite pseudorange measurement are common to users over a certain geographic area. A GPS reference receiver at a fixed known location calculates its GPS position from the GPS satellite signals. The reference receiver's fixed, known position is predetermined from an accurate site survey. The difference between the reference receiver's fixed, known position and its calculated GPS position is the error in the GPS signal, known as "correction factors". The GPS reference receiver then transmits these correction factors to the primary GPS receiver over a data link. The data link uses one of several possible standard (RF or microwave) data formats, depending on the application.

To obtain the precision needed for GPS guided approach and landing for aircraft, various methods have been described utilizing DGPS. One method of using DGPS for aircraft approach and landing is described in U.S. Pat. No. 5,311,194 to Brown wherein an intermediate pseudolite transmits the correction factors on a carrier signal having a frequency in the L-band. A fixed reference receiver measures the GPS correction factors from the satellite code and carrier measurements and sends these correction factors to a pseudolite for transmission to the primary GPS receiver on-board the aircraft for use in the navigation solution. Another prior art method is described in U.S. Pat. No. 4,866,450 to Chisolm wherein a ranging reference signal modulated with correction factors is transmitted from a base transmitter synchronized with GPS time.

The problem with the present GPS approach and landing systems, however, is the use of DGPS to develop correction factors with the corresponding requirement that the exact location of the fixed reference receiver be known. Current DGPS systems cannot operate without knowledge of the exact position of the reference receiver. To obtain this fixed, known position, an accurate site survey of the placement of the reference receiver is essential. As a result, current DGPS systems are inoperable until an accurate site survey of the location or position of the reference receiver is performed. As such, DGPS systems cannot be utilized for precision approach and landing of aircraft where an accurate site survey is not possible or has not been performed. Accordingly, there exists a need for a highly portable precision approach and landing system to support aircraft operations in tactical and/or emergency situations where an accurate site survey is not possible. Further, there is needed a precision approach and landing system for uplinking GPS data to aircraft to provide CAT-I (or near CAT-I) accuracy with a very high level of integrity.

SUMMARY OF THE INVENTION

An apparatus and method for precision approach and landing of an aircraft using relative GPS in accordance with the present invention provides for a navigation landing system having a ground station and an airborne station. The airborne station generates guidance information to guide the aircraft to a desired point (touchdown point) relative to the ground station located near one or more airport runways.

The ground station includes a first navigation receiver, a ground station processor and a datalink transmitter. The first navigation receiver is coupled to an antenna to receive satellite navigation signals transmitted from a plurality of GPS satellites and generates pseudorange data (for the ground station platform) corresponding to each of the GPS satellites. The processor formats the pseudorange data and offset data relating to the position of the desired point with respect to the ground station to generate a ground station data message. This data message is then transmitted over a datalink by the datalink transmitter to the airborne station located aboard the aircraft.

The airborne station, including a datalink receiver, receives the data message transmitted over the datalink. A second navigation receiver receives satellite navigation signals transmitted from a plurality of GPS satellites. From the received data message and the received satellite navigation signals, a processor calculates both a relative position of the ground station and a relative position of the aircraft. From these relative positions, a relative position vector is generated to derive guidance information for an approach and landing of the aircraft.

DESCRIPTION OF THE DRAWINGS

For a more complete understanding of the present invention and the advantages thereof, reference is made to the following detailed description taken in conjunction with the accompanying drawings wherein.

DETAILED DESCRIPTION

With reference to the drawings, like reference characters designate like or similar parts throughout the drawings.

Figure 1:
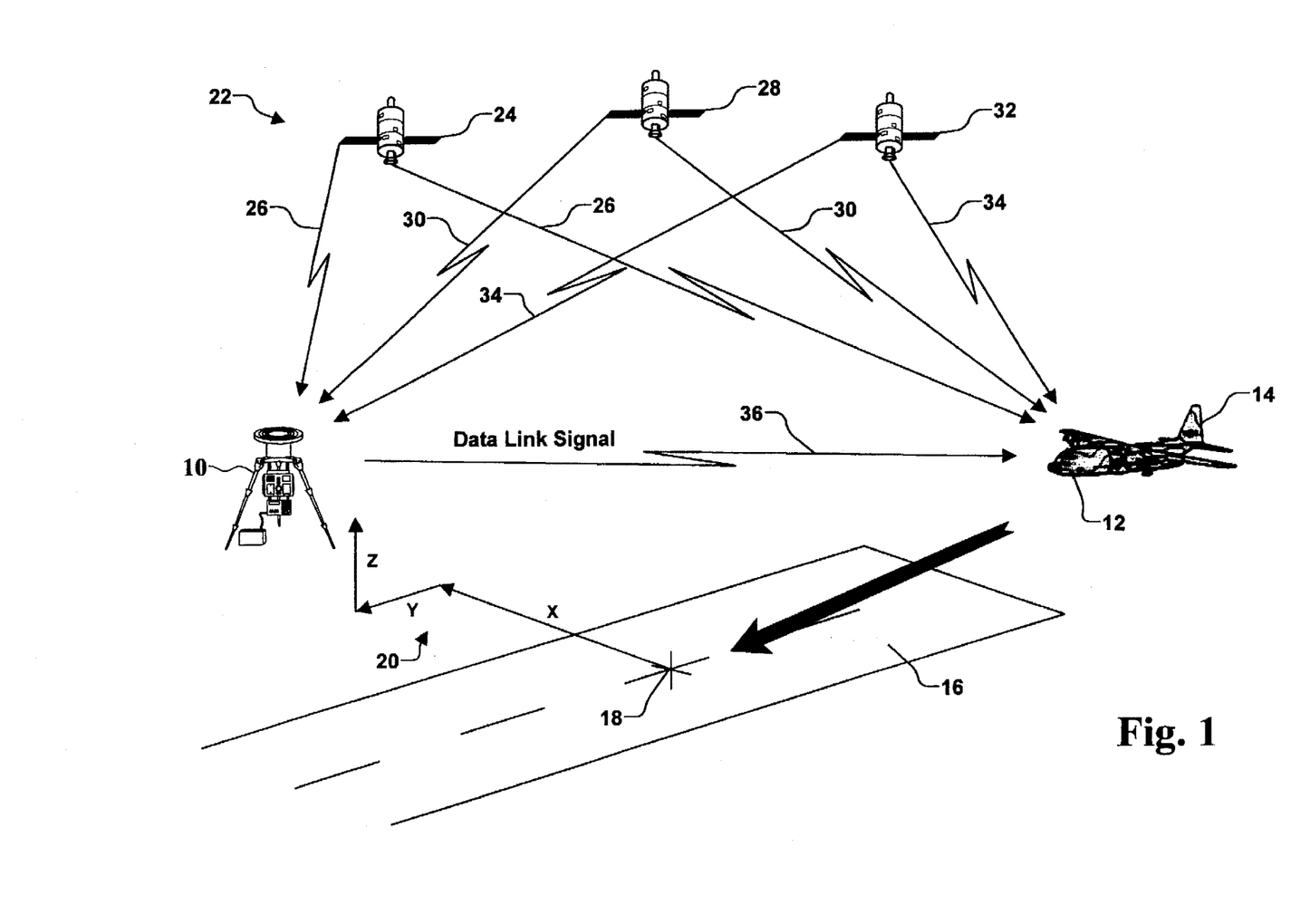
FIG. 1 illustrates a portable precision approach and landing system in accordance with the present invention.

Referring now to FIG. 1, there is illustrated a relative GPS-based portable precision landing system (PPLS) in accordance with the present invention. The PPLS includes a ground station 10 and an airborne station 12 located on board an aircraft 14. The aircraft 14 is shown approaching a runway 16 for landing and touchdown at a desired touchdown point 18. The touchdown point 18 is located at an offset distance (x,y,z) from the ground station 10, represented by the reference numeral 20.

The ground station 10 and the airborne station 12 continuously monitor and receive GPS signals transmitted from a plurality of GPS satellites 22. The plurality of GPS satellites 22 includes all GPS satellites (possibly up to 12) visible to the ground station 10 and to the airborne station 12. Only three GPS satellites are shown in FIG. 1. A GPS satellite 24 transmits a GPS signal 26, a GPS satellite 28 transmits a GPS signal 30 and a GPS satellite 32 transmits a GPS signal 34. Accordingly, both the ground station 10 and the airborne station 12 receive the GPS signals 26, 30 and 34, including any receivable GPS signals from other visible GPS satellites.

The ground station 10 performs measurements on the signals received from the satellites to obtain GPS data. These measurements may include pseudorange, pseudorange rate and/or carrier phase measurements (and possibly doppler). The ground station 10 processes the GPS data into a ground station data message for transmission over a datalink 36 to the airborne station 12. Alternatively, the ground station 10 performs calculations on the GPS data to generate the GPS position of the ground station 10, and then transmit this position information over the datalink 36. The datalink 36 provides a communications link between the ground station 10 and the airborne station 12 located on-board the aircraft 14. From the GPS data (whether raw measurement data or actual GPS position data) received over the data link 36, the airborne station 12 computes, from the position of the airborne station 12 with respect to the relative position of the ground station 10, a flight position vector.

Based upon the offset distance 20 and the computed relative positions of the ground station 10 and the aircraft 14 (the airborne station 12), the airborne station 12 determines a relative position vector to generate guidance information allowing the aircraft 14 to approach and land on the runway 16 with touchdown at the desired touchdown point 18. Accordingly, the present invention determines the relative GPS positions of the ground station and the aircraft and utilizes the known offset of the desired touchdown point from the ground station to provide precision approach and landing of the aircraft.

The basic relative GPS (RGPS) concept consists of determining the relative positions of two platforms as opposed to the requirement of knowing the absolute position of a reference platform, as is required with differential GPS (DGPS). This eliminates the need for the ground station to know its exact latitude, longitude and altitude. RGPS provides an inherent accuracy advantage by not depending on a GPS site survey at the ground station. The key requirement of a RGPS system is that the two platforms (herein, the ground station and the airborne station) use the exact same set of satellites measurements to calculate their positions. This ensures that any errors in the GPS observed when determining the positions are correlated, thus resulting in accurate relative positioning.

There are several embodiments available to implement the relative GPS (RGPS) system using various forms of uplink data. In accordance with one embodiment, the ground station calculates its own position using a particular set of satellites and then relays the position along with the appropriate satellite vehicle identifications (SVIDs) to the airborne station. The airborne station then calculates its position using that particular set of satellites. This results in two relative positions that contain consistent errors and an accurate relative position vector.

In accordance with a second embodiment, the ground station calculates its own position several times using all possible combinations of satellites. These position solutions are then time-tagged with the appropriate SVIDs and relayed to the airborne station. The airborne station then selects one of the calculated positions for the ground station and uses the corresponding set of satellites to determine its own position.

In the preferred embodiment, the ground station makes full pseudorange measurements for all the in-view satellites and uplinks these time-tagged pseudorange and pseudorange rate measurements to the airborne station. The airborne station then selects the best set of common satellites for determining both its own position and the position of the ground station, and then calculates the two positions. From these two positions, the airborne station calculates a precise 3-D direction vector to the ground station. The ground station continuously uplinks various approach waypoints relative to its location, and the aircraft system calculates guidance data to these waypoints. This method ensures control of satellite coordination between the ground station and the airborne station. As will be understood, while all three methods are different in regards to the amount and type of data transmitted over the data link, any of these methods may be used with the present invention.

Figure 2:
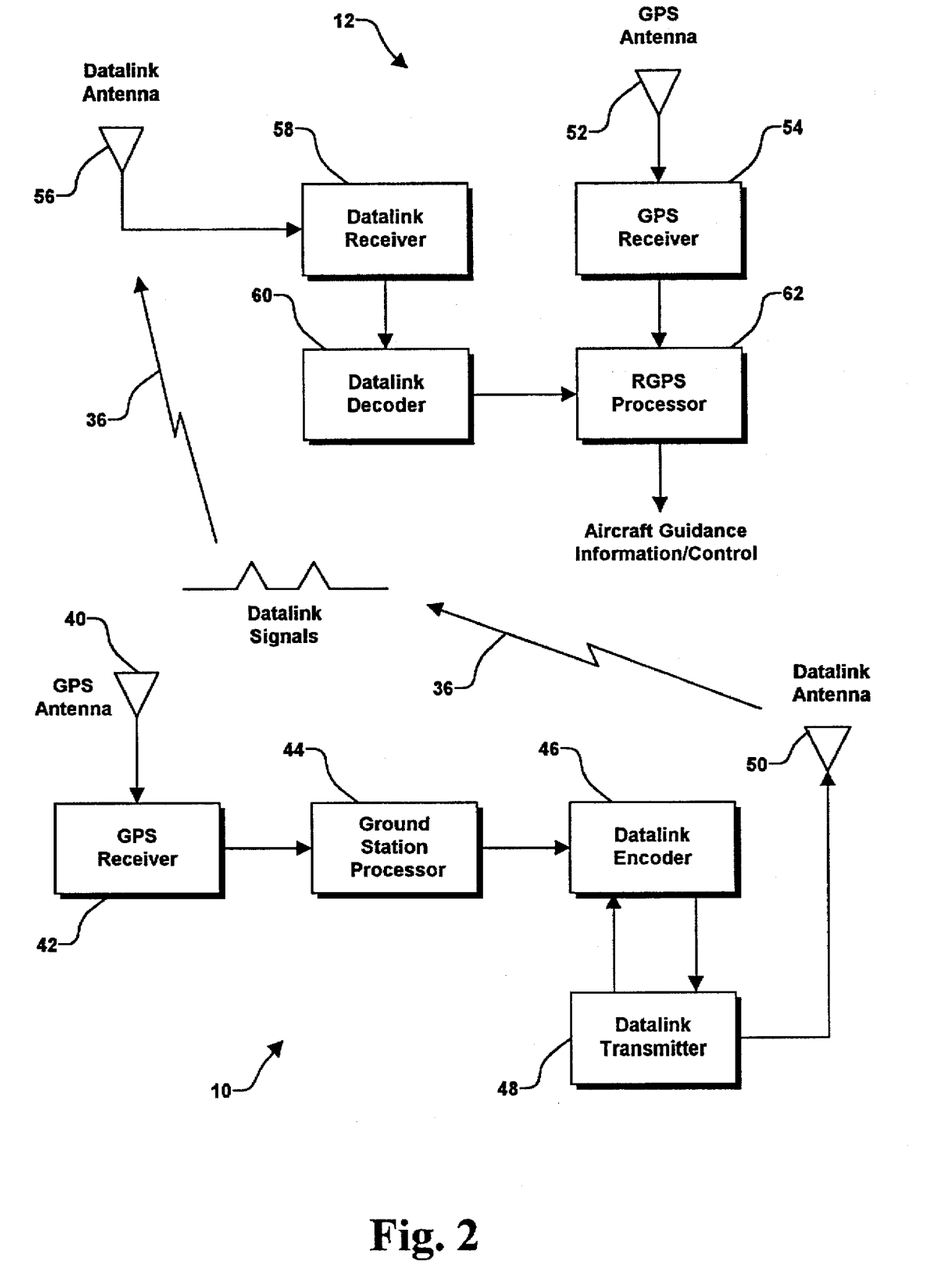
FIG. 2 is a high level block diagram illustrating a ground station and an airborne station of the approach and landing system.

Now referring to FIG. 2, there is shown a high level block diagram of the ground station 10 and the airborne station 12 of the present invention. The ground station 10 includes a GPS antenna 40, a GPS receiver 42, a ground station processor 44, a datalink encoder 46, a datalink transmitter 48 and a datalink antenna 50. GPS signals from all visible GPS satellites 20 (shown in FIG. 1) are received by the GPS antenna 40. The GPS receiver 42 makes GPS satellite pseudorange and carrier measurements on the acquired GPS signals.

The ground station processor 44 formats the pseudorange and carrier measurement data into a ground station data message. The data message also includes information concerning different glide slopes, decision heights and waypoints to provide for a number of simultaneous approaches. The waypoints describe locations (the desired touchdown points) relative to the ground station 10. As such, the offset 20 (shown in FIG. 1) describes the relative location of the desired touchdown point 18 with respect to the ground station 10. The ground station data message is encoded by the datalink encoder 46 and transmitted by the datalink transmitter 48 and the datalink antenna 50 over the datalink 36 (also shown in FIG. 1).

The airborne station 12 receives the ground station data message over the datalink 36 by a datalink antenna 56 and a datalink receiver 58. A datalink decoder 60 decodes the ground station data message and inputs this data to a RGPS processor 62.

The airborne station 12 further includes a GPS antenna 50 for receiving GPS signals from all visible GPS satellites and a GPS receiver 52 for making pseudorange and carrier measurements of all received signals. These measurements are input to the RGPS processor 62. The RGPS processor selects a set of common GPS satellites to be used in calculating a relative position for the ground station 10 and a relative position for the aircraft 14. The relative positions are calculated using the decoded data from the datalink decoder 60 and the pseudorange and carrier measurements from the GPS receiver 54, respectively. As such, a three dimensional position and clock bias are generated for the ground station 10 and for the aircraft 14.

The RGPS processor 62 further calculates a relative position vector using the calculated relative positions and the known offset distance 20 between the ground station 10 and the desired touchdown point 18. This relative position vector allows flight guidance information to be generated to guide the aircraft during approach and landing.

Figure 3:
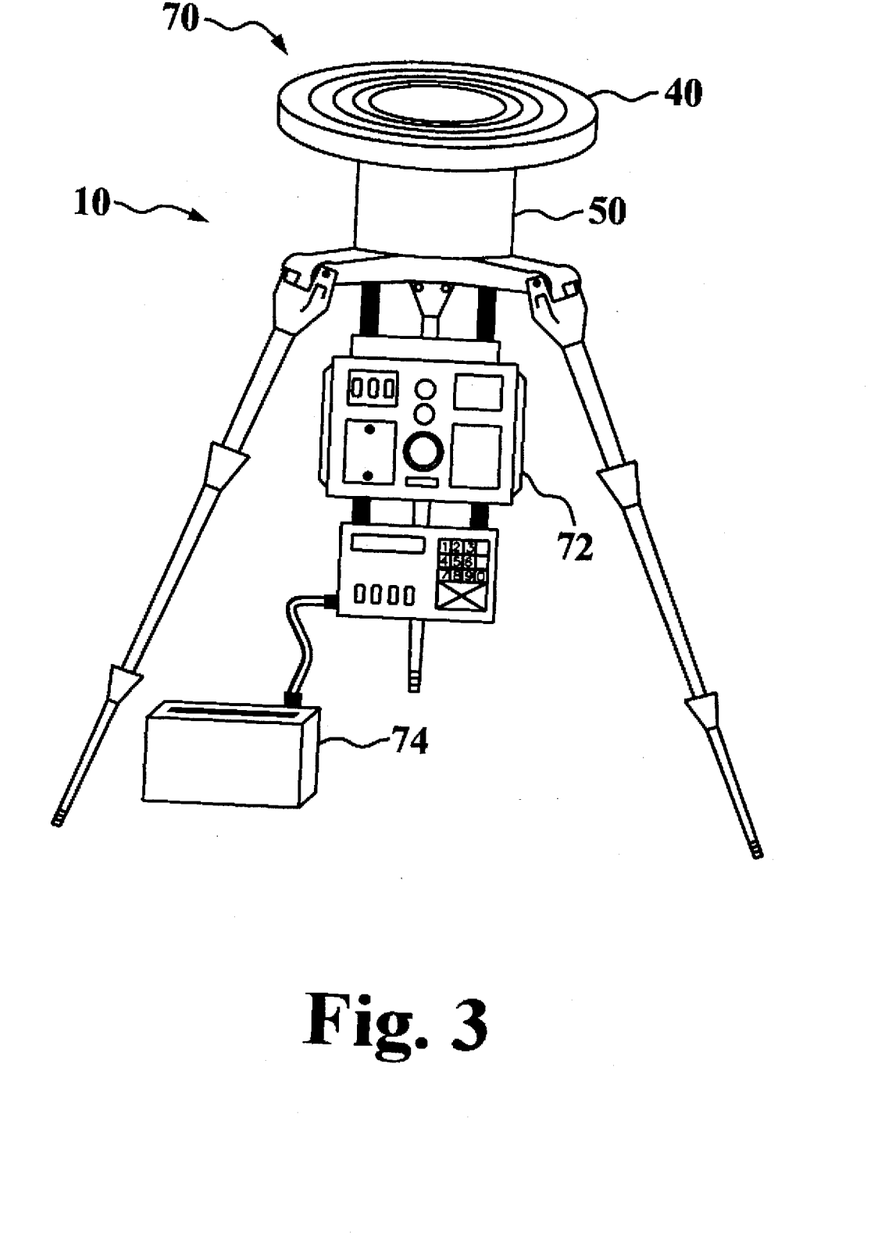
FIG. 3 is a front view illustrating a preferred embodiment of the ground station.

Now referring to FIG. 3, there is illustrated a preferred embodiment of the ground station 10. The ground station 10 is generally built around a modified AN/TRN-41 portable TACAN/DME (Tactical Air Navigation/Distance Measuring Equipment). The ground station 10 is shown including a PPLS antenna assembly 70 comprising the GPS antenna 40 and the datalink antenna 50. Preferably, the GPS antenna 40 is a choke-ring GPS antenna exhibiting high multipath attenuation characteristics, and the datalink antenna 50 is an omni-directional TACAN/DME antenna. The ground station 10 further includes a ground station assembly 72 comprising the GPS receiver 42, the ground station processor 44, the datalink encoder 46 and the datalink transmitter 48 (shown in FIG. 2) and a battery 74 for supplying power to the ground station 10.

Figure 4:
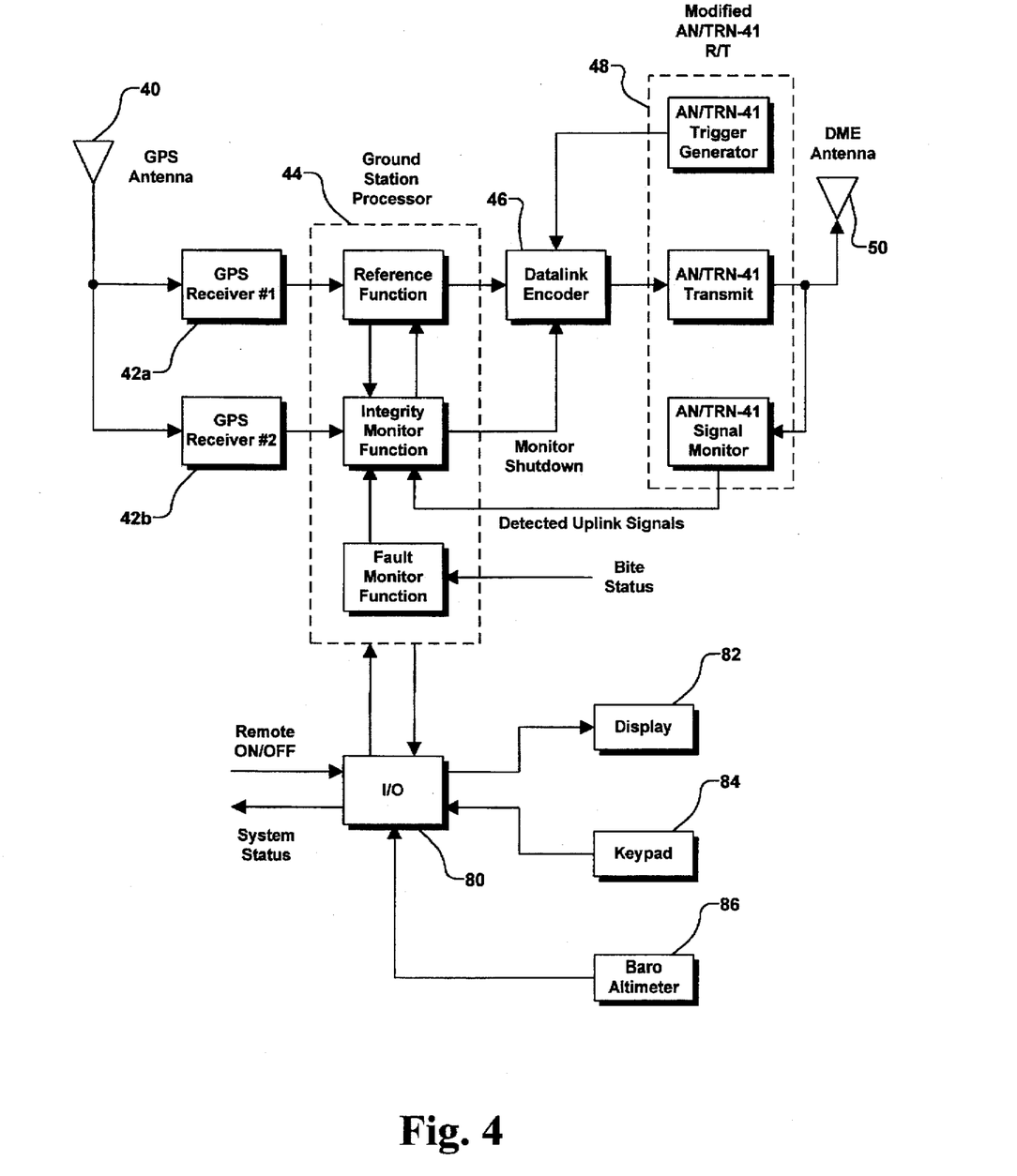
FIG. 4 is a detailed block diagram of the ground station.

Now referring to FIG. 4, there is illustrated a more detailed block diagram of the ground station 10. Two GPS receivers 42a and 42b are included in the ground station 10. The primary GPS receiver 42a is the primary reference channel receiver while the integrity GPS receiver 42b is the integrity channel receiver. Preferably, the GPS receivers 42a, 42b each can simultaneously track up to twelve satellites and have a pseudorange accuracy on the order of 0.5 meters rms.

Utilization of two GPS receivers 42a, 42b in the ground station 10 provides a high integrity GPS system. The ground station processor 44 performs a high integrity monitoring function that monitors the data received from the two GPS receivers 42a, 42b, a built-in test (BIT) signal and the datalink signal transmitted from the ground station 10. The integrity monitoring performed by the station processor 44 reduces the possibility that erroneous data will be uplinked to the user.

An I/O interface 80 coupled to the ground station processor 44 allows for external remote system control via a remote on/off status input. A keypad 84 is coupled to the I/O interface 80 to provide input and control of the ground station 10. The keypad 84 preferably is a weatherproof keypad and is used to input site-specific information (i.e. offset information, etc.) and control the ground station 10. A display 82 also coupled to the I/O interface 80 provides a means to confirm proper data entry from the keypad 84 and display system status. Preferably, the display 82 is a weatherproof, internally backlit, NVG compatible LCD display. Additionally, a barometric altimeter 86 is coupled to the I/O interface 80 to provide current altimeter readings of the ground station 10.

Ground station siting is an important part of the PPLS of the present invention. It is preferred that the ground station location be in the line-of-sight of the touchdown points of all runways that require precision approach service, and in the line-of-site of the approach paths to those runways. Generally, three pieces of site information are required to set up the PPLS of the present invention for each approach. First, a magnetic compass measurement of each runway's alignment is needed. Second, an accurate ground station offset (the relative position of the ground station GPS antenna to the desired touchdown points of each runway) must be determined. Third, the desired glide slope for each runway, ensuring adequate obstacle clearance, must be determined.

Various methods may be used to obtain this information. One such method is to use a small transit and range finder such as the TOPCON CTS-2 electronic total station. The CTS-2 is capable of measuring magnetic bearing, approach angle and range, with the results reported via an electronic readout. Angle measurements are accurate to +/− ten seconds and range is accurate to fractions of centimeters, up to 2300 feet. A small, collapsible calibrated rod incorporating a small prism for the rangefinder is available.

After this information is determined, it is entered into the ground station 10. For each approach, the ground station processor 44 calculates offset coordinates from the ground station 10 for an initial approach waypoint, a final approach waypoint and a threshold crossing waypoint. In addition, a middle marker distance and decision height are calculated. A set of waypoints defining a missed approach course may also be calculated if desired.

In the preferred embodiment, the waypoint data (for each approach) is uplinked every ten seconds to make it immediately available to approaching aircraft and to make certain that prior to the commencement of the approach, the waypoint data has been received numerous times (for high integrity). The current barometric altimeter setting is also continuously uplinked. Other data, such as runway in use, wind information, ATCS frequencies in use, etc., may also be uplinked, if desired.

Figure 5:
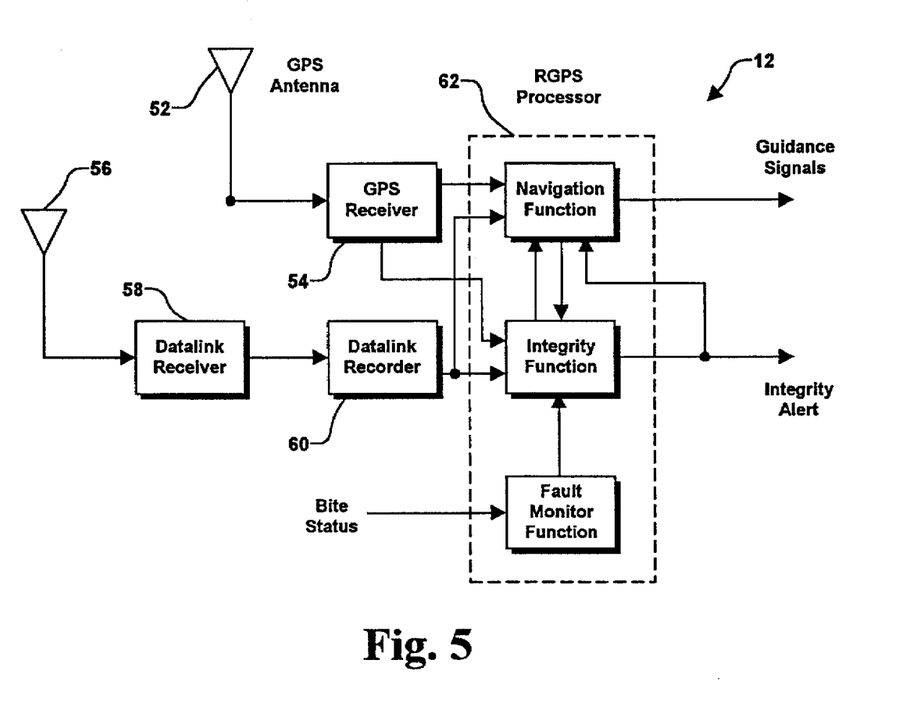
FIG. 5 is a detailed block diagram of the airborne station.

Now referring to FIG. 5, there is illustrated a block diagram of the airborne station 12. The airborne station 12 receives the ground station data message over the datalink 36 via the datalink antenna 56 and the datalink receiver 58. The ground station data message, containing data representing GPS measurements made by the ground station 10, offset information and approach and landing information, is decoded by the datalink decoder 60 and input to the RGPS processor 62.

The airborne station 12 also receives GPS signals from all visible GPS satellites via the GPS antenna 52. The GPS receiver 54 performs pseudorange (and/or carrier phase) measurements on all received GPS signals. The measured pseudoranges for all visible GPS satellites are then input to the RGPS processor 62.

After selecting a set of common GPS satellites, the RGPS processor 62 calculates a relative position for the ground station 10 using the information received from the ground station data message received over the datalink 36. The RGPS processor also calculates a relative position for the aircraft 14 using the pseudoranges measured by the GPS receiver 54. Once the relative positions of the ground station 10 and the aircraft 14 are determined, the RGPS processor 62 uses these relative positions and the known offset distance 20 between the ground station 10 and the desired touchdown point 18 to calculate a relative position vector. This relative position vector allows flight guidance information or guidance signals to be generated to guide the aircraft during approach and landing.

As will be appreciated, the RGPS processor 62 may also perform a GPS integrity monitoring function that uses independent software code to check the calculated GPS position of the ground station 10 and the aircraft 14. Additionally, an independent fault monitoring function may also be included in the RGPS processor 62 to monitor the operation of the airborne hardware.

Figure 6:
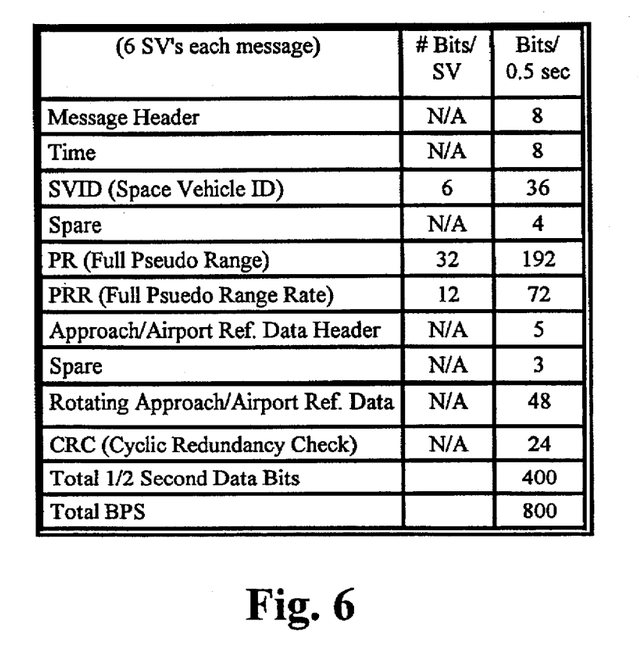
FIG. 6 is a chart illustrating a data message format utilized by the datalink in accordance with the present invention.

Referring now to FIG. 6, there is illustrated the preferred embodiment of a data structure or format for the ground station data message. In general, update rates required to perform DGPS CAT-I approaches using C/A code receivers is in the range of 10–20 seconds. The primary factor driving the update rate is the Selective Availability (SA) errors purposely introduced into the C/A code GPS signals. If the PPLS of the present invention uses GPS signals that have the SA component removed, the minimum update period can exceed 10–20 seconds and still provide CAT-I accuracy.

In the preferred embodiment, the data format shown in FIG. 6 has been defined to support a 1-second relative GPS up-link data update rate for up to twelve GPS satellites. The ground station data message is transmitted every one-half second and includes two message types—message type 1 and message type 2. Message type 1 contains relative GPS data for the GPS measurements made at the ground station 10 for six of the visible GPS satellites (up to a total of 12 visible GPS satellites). The data required for each satellite includes the space vehicle identification (SVID, 6 bits), the full pseudorange measurement (PR, 32 bits) and the full pseudorange rate measurement (PRR, 12 bits). Message type 2 contains data for the other six GPS satellites.

Each message type 1 and message type 2 contain one of eighteen (18) data sub-messages each comprising a portion of data to provide for six simultaneous CAT-I approaches. The data sub-messages include offset information and may include data for different glide slopes, decision heights and waypoints. As will be understood, three data sub-messages are required for a full set of data for one approach. Each message type contains an airport reference data header (5 bits) and airport reference data (48 bits). As such, a full set of airport approach data (for all six approaches) is repeated every ten (10) seconds.

Also included in both message type 1 and message type 2 are data fields for a message header (8 bits), time (8 bits), spare bits (7 bits) and a cyclic redundancy check (CRC, 24 bits). Accordingly, the messages include 400 total bits and are transmitted every one-half second.

It will be understood that alternative data, data formats and update rates may be used with the present invention. As discussed earlier, there are several embodiments to implement an RGPS system. In these regards, the data in the ground station data message may comprise the actual calculated GPS position of the ground station with respect to one set of visible satellites. Alternatively, the data in the ground station data message may comprise several actual calculated GPS positions of the ground station using all possible combinations of visible satellites.

Figure 7:
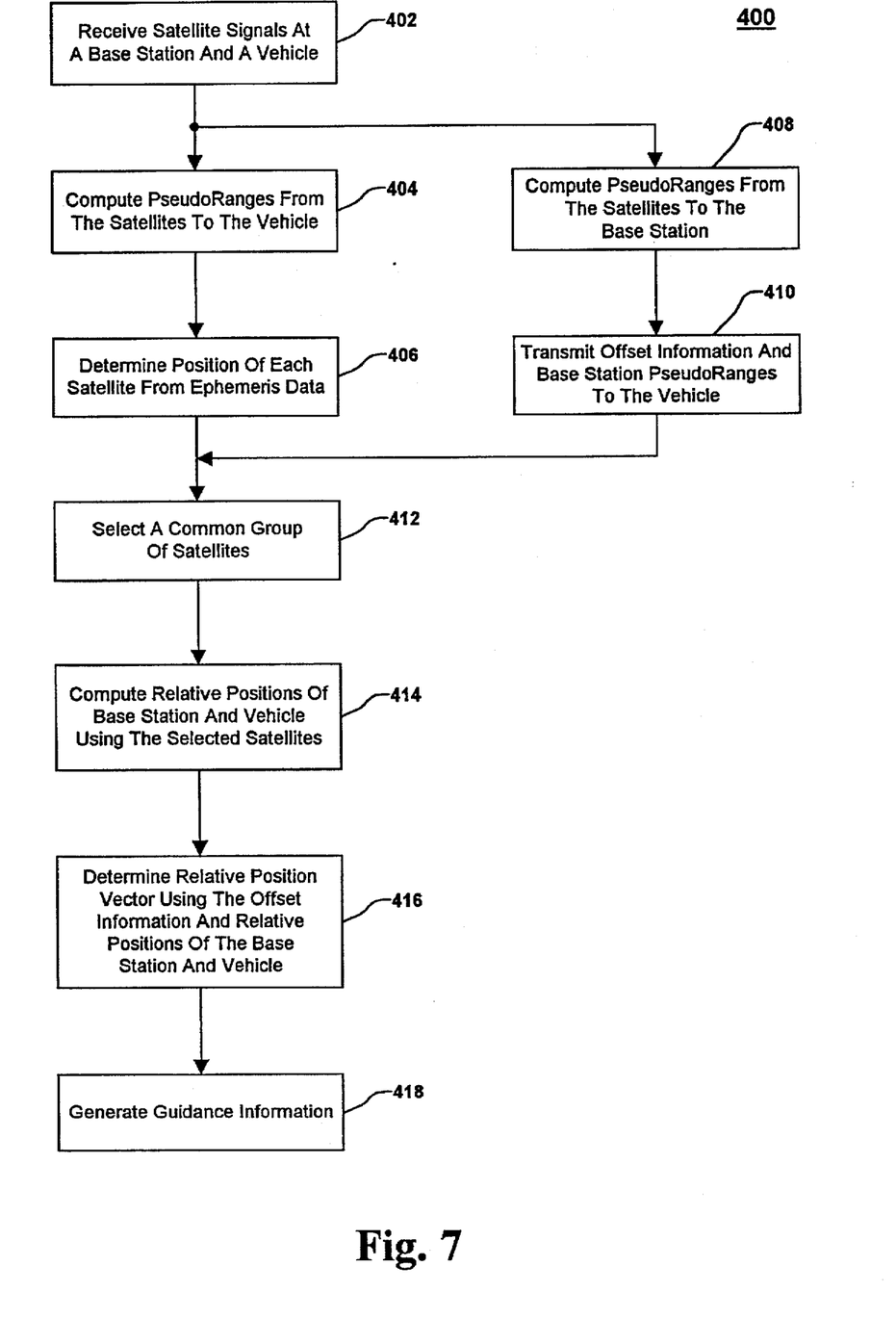
FIG. 7 is a flow diagram illustrating the steps performed in accordance with the present invention for determining the relative positions of the base station and the aircraft and generating flight guidance information.

Referring now to FIG. 7, there is shown a high level flow diagram 400 of the method of the present invention. At step 402, GPS signals transmitted from all visible satellites are continuously received at both the ground station 10 and the airborne station 12 on-board the aircraft 14. In a step 404, the GPS signals received by the airborne station 12 are used to compute pseudoranges from the satellites to the aircraft 14. The position of each satellite is also determined, in a step 406, by the airborne station 12 from ephemeris data. The airborne station 12 uses almanac data or ephemeris data extracted from the GPS signals to determine the position of each of the transmitting satellites.

Meanwhile, in a step 408, the GPS signals received by the ground station 10 are used to compute pseudoranges from the satellites to the ground station 10. In a step 410, the pseudoranges measured in step 408 are time tagged, formatted into the ground station data message and transmitted over the datalink 36 to be received by the aircraft 14. Additionally, offset 20 (position proximate relationship) between the touchdown point 18 and the ground station 10 is also added to the ground station data message prior to its transmission over the datalink. The offset 20 between the desired touchdown point 18 and the ground station 10 is measured and input into the ground station processor 44 of the ground station 10 prior to operation.

After the measured pseudoranges of the ground station 10 and offset information is transmitted to the aircraft 14 and after the measured pseudoranges of the aircraft 14 and the positional information of the satellites are known, the airborne station 12 selects a common group of satellites (and associated pseudoranges) to be used to calculate the relative positions of the ground station 10 and the aircraft 14 in a step 412. In a next step 414, the relative positions at a time "t" are computed by the airborne station 12. From the calculated relative positions, a relative position vector is determined in a step 416 based upon the positional relationship of the ground station 10 in relation to the aircraft 14. The offset information is also taken into consideration when the relative positive vector is calculated. In a step 418, flight guidance information is generated from the relative position vector. The flight guidance information provides precision approach and landing of the aircraft 14.

Use of the same set of satellites to calculate the positions of the ground station 10 and the aircraft 14 ensures that the errors observed when determining these positions are correlated thus resulting in accurate relative positioning. The relative navigation solution is based upon the calculations of both the base station and the aircraft positions using one set of ephemeris data and raw measurement data (pseudorange, etc.) from both receivers.

Figure 8:
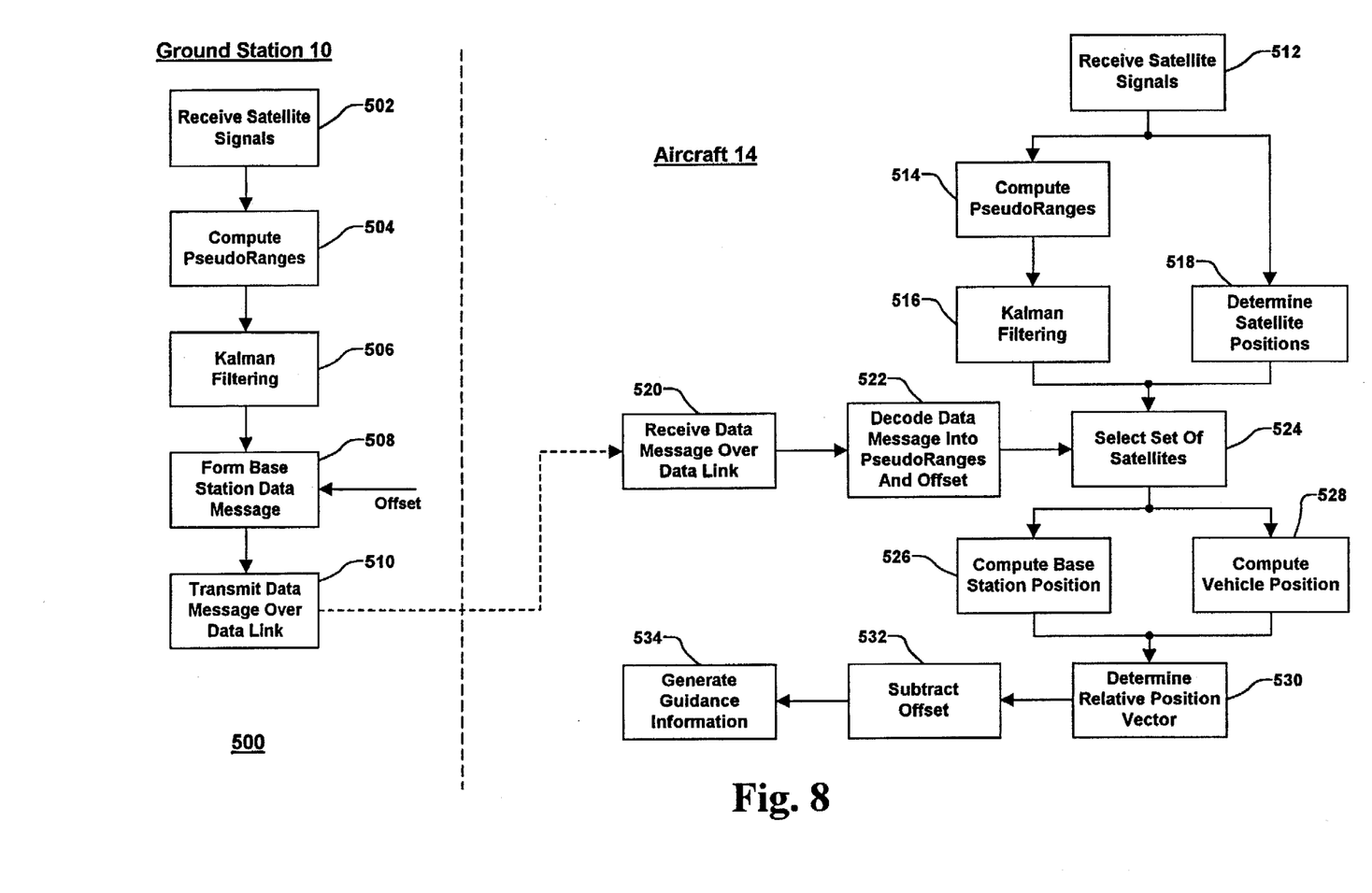
FIG. 8 is an alternative embodiment of the flow diagram shown in FIG. 7.

Referring now to FIG. 8, there is shown the preferred embodiment of a detailed flow diagram 500 of the method of the present invention. At steps 502 and 512, GPS signals transmitted from all visible satellites are continuously received at both the ground station 10 and the airborne station 12 on-board the aircraft 14. In a step 504, the GPS signals received by the ground station 10 are used to compute (or measure) pseudoranges from the satellites to the ground station 10. Before the pseudoranges are sent to be formatted into the ground station data message, these ranges are filtered using a complementary Kalman filter in step 506. The Kalman filtering is based on the more stable carrier phase measurements.

In a step 508, the Kalman filtered pseudoranges are time tagged and formatted into the ground station data message, and are transmitted over the datalink 36, in step 510, to be received by the aircraft 14. Additionally, offset 20 (position proximate relationship) between the touchdown point 18 and the ground station 10 is also added to the ground station data message prior to its transmission over the datalink. The offset 20 between the desired touchdown point 18 and the ground station 10 is measured and input into the ground station processor 44 of the ground station 10 prior to operation.

In a step 514, the GPS signals received by the airborne station 12 are used to compute (or measure) pseudoranges from the satellites to the airborne station 12. Before the pseudoranges can be used, these ranges are filtered using a complementary Kalman filter in step 516. The Kalman filtering is based on the more stable carrier phase measurements. The position of each satellite is also determined, in a step 518, by the airborne station 12 from ephemeris data. The airborne station 12 uses almanac data or ephemeris data extracted from the GPS signals to determine the position of each of the transmitting satellites.

In a step 520, the airborne station 12 receives the ground station data message over the datalink 36. The ground station data message is decoded, in a step 522, to recover the data previously formatted by the ground station 10 into the ground station data message at step 508.

After the measured pseudoranges generated by the ground station 10 and offset information are transmitted to the aircraft 14 and after the measured pseudoranges of the aircraft 14 and the positional information of the satellites are known, the airborne station 12 selects a common group of satellites (and associated pseudoranges) for use in calculating the relative positions of the ground station 10 and the aircraft 14 in a step 524. In a next step 526, the relative position of the ground station 10 at a time "t" is computed by the airborne station 12. Further, the relative position of the airborne station 12 at a time "t" is computed in a step 528.

From the relative positions of the ground station 10 and aircraft 14, a relative position vector is determined in a step 530 based upon the positional relationship of the ground station 10 in relation to the aircraft 14. The offset information is subtracted from the relative position vector in a step 532. In a step 534, flight guidance information is generated from the relative position vector after taking into account the offset information. The flight guidance information provides precision approach and landing of the aircraft 14.

Various communication datalinks may be used with the present invention. To obtain a reasonable operational capability, it is important to utilize signals that can be used internationally without interference from, or interference with, any existing radio systems. New signal formats may require years of testing to receive international approval to use the new signal format. It will be understood that while numerous and varied types of communication datalinks may be used, the datalink communication system described in copending U.S. application Ser. No. 08/526,231 is preferred. Accordingly, the copending U.S. application Ser. No. 08/526,231 is incorporated herein by reference.

Although several embodiments of the present invention have been described in the foregoing detailed description and illustrated in the accompanying drawings, it will be understood by those skilled in the art that the invention is not limited to the embodiments disclosed but is capable of numerous rearrangements, substitutions and modifications without departing from the spirit of the invention.

What is claimed is:

1. A navigation system for an aircraft, comprising:
  a ground station comprising:
    a first navigation receiver coupled to an antenna to receive satellite navigation signals transmitted from a plurality of satellites, said first navigation receiver generating pseudorange data corresponding to each of said plurality of satellites;
    a ground station processor for processing the pseudorange data and offset data identifying the location of the ground station relative to an aircraft runway touchdown position, said processor generating a ground station data message;
    a data input interface for inputting the offset data to the ground station processor;
    an encoder for encoding the ground station data message;
    a datalink transmitter coupled to said encoder and to a datalink antenna for transmitting the encoded ground station data message over a datalink; and
  an airborne station aboard the aircraft comprising:
    a second navigation receiver coupled to an antenna to receive satellite navigation signals transmitted from a plurality of satellites;
    a datalink receiver coupled to an antenna for receiving the encoded ground station data message over the datalink;
    a decoder for decoding the encoded ground station data message received via the datalink; and
    an airborne station processor coupled to said decoder for calculating a relative position of the ground station using the decoded ground station data message and a relative position of the aircraft using the satellite navigation signals received by the second navigation receiver, said airborne station processor generating a relative position vector corresponding to the position of the aircraft relative to a reference point, said airborne station processor generating the relative position vector from the offset data and from the relative positions of the ground station and the aircraft, and said airborne station processor computing guidance information from the relative position vector.

2. A navigation system in accordance with claim 1 wherein the ground station processor generates a plurality of ground station data messages each comprising a first data message including the pseudorange data for selected ones of the plurality of satellites.

3. A navigation system in accordance with claim 1 wherein the ground station data message comprises:
   a satellite identification data field;
   a pseudorange data field; and
   a pseudorange rate data field.

4. A navigation system in accordance with claim 3 wherein the ground station data message further comprises a second data message comprising the offset data.

5. A navigation system in accordance with claim 4 wherein the second data message comprises:
   an approach reference data header data field; and
   an approach reference data field.

6. A navigation system in accordance with claim 1 wherein the datalink antenna comprises a TACAN/DME antenna.

7. A navigation system in accordance with claim 6 wherein the data input interface comprises:
   an I/O interface coupled to the ground station processor;
   a keyboard coupled to the I/O interface for inputting the offset data; and
   a display coupled to the I/O interface for verifying the input offset data.

8. A navigation system in accordance with claim 1 wherein the airborne station processor generates guidance information comprising one or more intermediate approach waypoints between the aircraft and the desired touchdown point.

9. A navigation system in accordance with claim 1 wherein the airborne station processor generates guidance information comprising desired glide slope information.

10. A navigation system in accordance with claim 1 wherein the ground station processor monitors the integrity of the pseudorange data before generating a ground station data message.

11. A navigation system in accordance with claim 10 wherein the first navigation receiver comprises two Global Positioning System receivers.

12. A navigation system in accordance with claim 11 wherein the ground station processor monitors the integrity of the pseudorange data by monitoring the data received from the two Global Positioning System receivers, a test signal, and the encoded ground station data message transmitted over the datalink.

13. A navigation system in accordance with claim 10 wherein the airborne station processor monitors the integrity of the pseudorange data received by the second navigation receiver.

14. A navigation system in accordance with claim 13 wherein the airborne station processor monitors the integrity of the pseudorange data by monitoring the data received from the second navigation receiver, a test signal, and the encoded ground station data message received over the datalink.

15. A navigation system in accordance with claim 1 wherein the airborne station processor calculates the relative position of the aircraft and the relative position of the ground station using a common group of satellites.

16. A navigation system in accordance with claim 1 wherein the first navigation receiver comprises a choke-ring GPS antenna exhibiting high multipath attenuation characteristics.

17. A navigation system in accordance with claim 12 wherein the datalink transmitter further comprises a trigger generator coupled to the datalink encoder for encoding the ground station data message.

18. A relative positioning system for use on an aircraft for approach and landing on a runway and touchdown at a desired touchdown point, the positioning system comprising:
   a navigation receiver coupled to an antenna to receive satellite navigation signals transmitted from a plurality of satellites;
   a data link receiver coupled to an antenna to receive a TACAN/DME datalink signal from a ground station, said TACAN/DME datalink signal including position information and offset information, said position information generated by the ground station from satellite navigation signals and said offset information representing the position offset of the desired touchdown point relative to the ground station;
   a processor for calculating from the TACAN/DME datalink signal a relative position of the ground station and for calculating a relative position of the aircraft from the satellite navigation signals received by the navigation receiver, said processor generating a relative position vector from the offset information and the relative positions of the ground station and the aircraft, the relative position vector defining the distance and direction of the aircraft from the desired touchdown point.

19. A method for aircraft approach and landing using relative positioning, comprising the steps of:
   receiving satellite navigation signals at a ground station and at an aircraft;
   computing pseudorange data for the ground station using the satellite navigation signals received at the ground station to generate a set of ground station pseudorange data;
   monitoring the integrity of the ground station pseudorange data;
   transmitting ground station site information and the set of ground station pseudorange data from the ground station to the aircraft, the site information including offset information relating to the position offset of a desired landing approach reference point relative to the ground station;
   computing pseudorange data for the aircraft using the satellite signals received at the aircraft;
   monitoring the integrity of aircraft pseudorange data;
   determining a satellite position relative to the aircraft for each of the satellites from ephemeris data contained within the satellite signals;
   selecting a group of satellites to be used in calculating a relative position and a clock bias of the ground station and a relative position and a clock bias of the aircraft;
   calculating at the aircraft the relative position and the clock bias of the ground station and the relative position and clock bias of the aircraft from the pseudorange data corresponding to the selected group of satellites;

determining a relative position vector from the offset information and the relative positions of the ground station and the aircraft, said relative position vector defining the position of the aircraft relative to the desired landing approach reference point; and generating guidance information using the relative position vector for approach and landing of the aircraft.

20. A method for aircraft approach and landing using relative positioning, comprising the steps of:

receiving satellite navigation signals at a ground station and at an aircraft;

computing pseudorange data using the satellite navigation signals received at the ground station at a time "t" to generate a set of ground station pseudorange data;

selecting a common group of satellites for use by the ground station and for use by the aircraft in calculating relative position data for the ground station and for the aircraft;

calculating at the ground station relative position data for the ground station from the set of ground station pseudorange data;

transmitting ground station site information and the relative position data for the ground station from the ground station to the aircraft, said ground station site information including offset information defining the offset position of a desired reference point relative to the ground station;

receiving the ground station site information and the relative position data for the ground station at the aircraft;

computing pseudorange data using the satellite signals received at the aircraft at the time "t" to generate a set of aircraft pseudorange data;

calculating at the aircraft relative position data for the aircraft from the set of aircraft pseudorange data;

determining a relative position vector from the offset information, the ground station relative position data, and the aircraft relative position data, said relative position vector defining the position of the aircraft relative to the desired reference point; and generating guidance information using the relative position vector for approach and landing of the aircraft.

21. The method of claim 20 further comprising the step of filtering the satellite navigation signals received at the ground station and at the aircraft using a Kalman filter before calculating the pseudorange data.

* * * * *